No. 742,860. PATENTED NOV. 3, 1903.
H. A. GROSSMAN.
MOUNTING FOR RIMLESS EYEGLASSES OR SPECTACLES.
APPLICATION FILED DEC. 15, 1902.
NO MODEL.
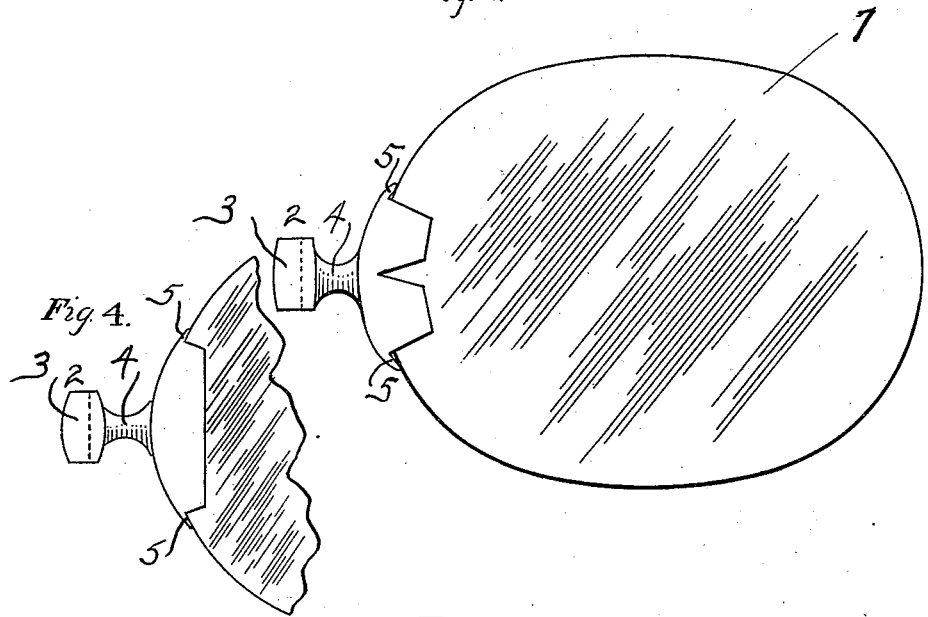
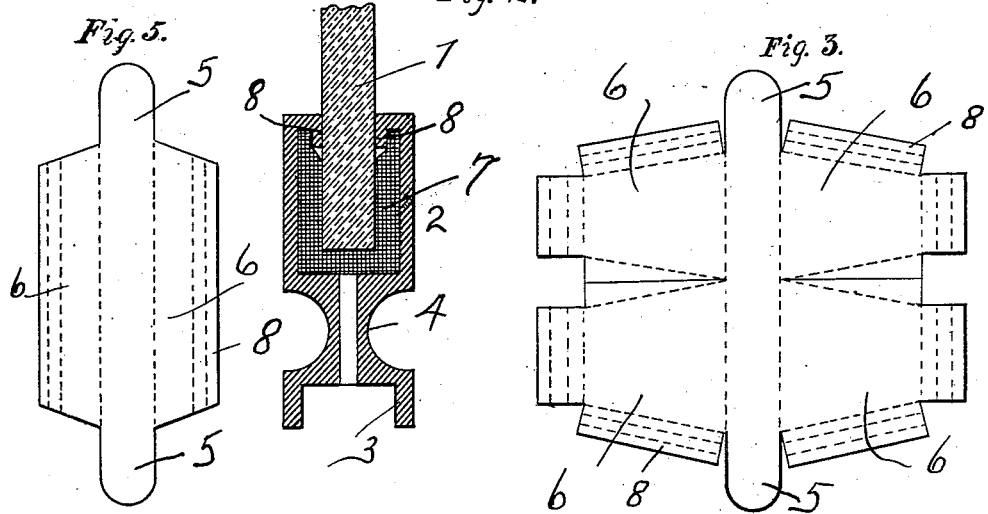
WITNESSES.
R. W. Combs.
V. M. Evans.
INVENTOR.
Henry A. Grossman
By Harry A. Knight
ATTY.

No. 742,860. Patented November 3, 1903.

UNITED STATES PATENT OFFICE.

HENRY A. GROSSMAN, OF KANSAS CITY, MISSOURI.

MOUNTING FOR RIMLESS EYEGLASSES OR SPECTACLES.

SPECIFICATION forming part of Letters Patent No. 742,860, dated November 3, 1903.

Application filed December 15, 1902. Serial No. 135,293. (No model.)

*To all whom it may concern:*

Be it known that I, HENRY A. GROSSMAN, a citizen of the United States, residing at Kansas City, in the county of Jackson and State of Missouri, have invented certain new and useful Improvements in Mountings for Rimless Eyeglasses or Spectacles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My present invention relates to an improved means for mounting glass, and more particularly to an improved mounting for rimless eyeglasses or spectacles.

Heretofore it has been customary in mounting rimless eyeglasses or spectacles to drill a perforation in the lens at either or both sides thereof, through which a screw carried by an eyestock was passed, the edge of the lens being pressed firmly against the strap of the stud. Such mounting is objectionable for several reasons. The infraction of the lens caused by the drilling of the screw-holes or perforations therein materially weakens the same, and when the lens is forced tightly against the strap of the stud, as it must be in order that the lens be held firmly and immovably, the strain on the glass at the point of perforation is great, so that the slightest jar will break the lens, and, in fact, the same frequently breaks while the glasses or spectacles are lying in the case.

The above objections it is my object to overcome by the improvements in structure herein described, and in which I dispense with the objectionable perforation and screw and provide an efficient and secure means for mounting the lens in which it is not necessary in any way to injure or cut the glass or lens and in which there is no strain on the same, therefore reducing the liability to breakage almost to an impossibility.

My improved mounting is clearly shown in the accompanying drawings, in which—

Figure 1 is a view of one of the lenses of a pair of rimless eyeglasses or spectacles mounted in accordance with my invention. Fig. 2 is a sectional view of the same, showing the glass or lens broken away. Fig. 3 is a plan view of the stud-strap with its projecting flaps as the same appears when stamped out. Fig. 4 is a view of a slightly-modified form of stud, and Fig. 5 is a plan view of the stud-strap with its flaps as shown in Fig. 4.

Referring to the drawings more in detail, 1 is the lens of any pair of rimless eyeglasses or spectacles. 2 is the stud carrying the same. The stud 2 is provided with the usual box 3 at one end of the neck 4 and the strap 5 at the other end thereof. The strap 5 is provided with flaps 6, projecting sidewise therefrom, as shown clearly in Figs. 3 and 5. These flaps may be of any number. 7 is a lining of papier-mâché, cloth, cork, or other suitable material, preferably a fibrous material, which is applied to the strap 5 and its projecting flaps 6, being secured thereon by means of the flanges 8 on the flaps 6, (indicated by dotted lines, Figs. 3 and 5,) which flanges 8 are folded over upon the lining 7, as clearly shown in Fig. 2. The flaps 6 are adapted to be folded at the line of their connection to the strap 5 to form jaws, as clearly shown in Fig. 2, to receive the lens 1.

In mounting the lens 1 in the stud 2 the flaps 6 are compressed near enough together to provide a substantially tight fit on the lens 1, the lining 7 having first been saturated with a suitable cement. The lens is then forced into the jaws or flaps 6 and allowed to set. The lining 7 is when set securely cemented to the lens 1 and securely fastened to the flaps 6 by the flanges thereon, so that a secure mounting is provided for the lens. It is preferable that the lining secured to the flap 6 and the faces of the lens 1 to be mounted be of fibrous material, inasmuch as the little fibers of the material combined with the adhesive firmly grip the surfaces of the glass.

It is obvious that any shape or contour of lens may be mounted by use of the form of flap shown in Fig. 1, inasmuch as the V-shaped cut between the two flaps 6 therein shown provides for the bending of the strap 5 to conform to the contour of the lens.

I do not wish to be understood as limiting myself to the exact shape or forms of flaps herein shown nor the exact means of securing the lining thereto, for both of these features may be varied without departing from the spirit of my invention. I do not want to be understood as limiting myself to the materials herein described as suitable for the lining of the flaps, inasmuch as any material suitable may be used without departing from the spirit of my invention, and, furthermore, I do not desire to be understood as limiting my invention to the mounting of lenses for eyeglasses or spectacles, inasmuch as the same is adaptable for use in any instance wherein it is desired to securely hold glass—such, for instance, as in mounting window-glass.

Having thus described my invention, the following is what I claim as new therein and desire to secure by Letters Patent:

1. In a means for securing metallic mounts to glass lenses, the combination with a metallic socket carried by the metallic mount and embracing both faces of the glass to be mounted, of a lining of non-metallic material secured within the socket on both sides of the glass, and an adhesive uniting said lining with the glass.

2. In a means for securing metallic mounts to glass lenses, the combination with a metallic socket carried by the metallic mount and embracing both faces of the glass to be mounted, of a lining of fibrous material secured within the socket on both sides of the glass, and an adhesive uniting said lining with the glass.

3. In a mounting for rimless eyeglasses and spectacles the combination with a pair of jaws, of linings of fibrous material secured to the inner surfaces of said jaws of a lens adapted to be inserted between said jaws, and an adhesive securing the said linings to the lens.

4. A means for attaching metallic mounts to spectacles, eyeglasses or the like, consisting of the opposed faces or projections on the metallic parts to be attached, having a space between them to receive the glass, and the filling-pieces of a material which may be readily cemented to glass, between the glass and metal, cemented to the former and engaged by the latter so as to prevent relative displacement therefrom.

5. In eyeglasses, spectacles or the like, the combination of the lens, linings or fillings of fibrous, absorbent, readily-cementable, material cemented to opposite points on the faces of the lens, and the metallic member having two projections or faces spaced apart to receive between them the lens with the linings or fillings and constructed to grip or engage the linings or fillings to prevent relative displacement of the parts.

6. In a means for securing metal mounts to glass lenses the combination with a pair of metallic jaws carried by the metal mount, a lining of non-metallic material, of U-shaped form secured within the jaws, and cement securing the lining and the glass lens together.

7. In a means for securing metallic mounts to glass lenses, the combination with a pair of metallic jaws carried by the metallic mount, and provided with sockets, of a non-metallic lining of U-shaped form secured within the sockets, and cement securing the linings and the lens together.

8. The combination with a mount comprising the straps 5, flaps 6, extending therefrom, and flanges 8 for the flaps, of a lining of non-metallic material, held by the flanges 8, and an adhesive for securing the lining to the glass lens.

9. A means for securing metal mounts to glass lenses comprising a non-metallic lining for the metal mount adhesively secured to both faces and the edge of the lens.

In testimony whereof I affix my signature in presence of two witnesses.

HENRY A. GROSSMAN.

Witnesses:
R. M. COMBS,
HARRY A. KNIGHT.